United States Patent
Iso et al.

(10) Patent No.: US 10,003,745 B2
(45) Date of Patent: Jun. 19, 2018

(54) IMAGING APPARATUS, IMAGING METHOD AND PROGRAM, AND REPRODUCTION APPARATUS

(71) Applicant: SONY CORPORATION, Tokyo (JP)

(72) Inventors: Daisuke Iso, Tokyo (JP); Hideshi Yamada, Kanagawa (JP); Teppei Kurita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/320,782

(22) PCT Filed: Jun. 23, 2015

(86) PCT No.: PCT/JP2015/067945
§ 371 (c)(1),
(2) Date: Dec. 21, 2016

(87) PCT Pub. No.: WO2016/006430
PCT Pub. Date: Jan. 14, 2016

(65) Prior Publication Data
US 2017/0155844 A1    Jun. 1, 2017

(30) Foreign Application Priority Data

Jul. 7, 2014    (JP) .................................. 2014-139507

(51) Int. Cl.
*H04N 5/232*  (2006.01)
*H04N 5/347*  (2011.01)
(Continued)

(52) U.S. Cl.
CPC ..... *H04N 5/23274* (2013.01); *H04N 5/23254* (2013.01); *H04N 5/23258* (2013.01);
(Continued)

(58) Field of Classification Search
CPC .... H04N 5/23274; H04N 5/345; H04N 5/347; H04N 5/3745; H04N 5/23254; H04N 5/23258
See application file for complete search history.

(56) References Cited

U.S. PATENT DOCUMENTS 5,563,652 A *  10/1996  Toba ..................... H04N 5/145
                                                   348/207.99
8,351,511 B2 *  1/2013  Mitsuya ............. H04N 5/23248
                                                   375/240.12
(Continued)

FOREIGN PATENT DOCUMENTS

JP  08-172566 A  7/1996
JP  2006-184679 A  7/2006
(Continued)

*Primary Examiner* — Luong T Nguyen
(74) *Attorney, Agent, or Firm* — Chip Law Group

(57) ABSTRACT

The present disclosure relates to an imaging apparatus, an imaging method and a program, and a reproduction apparatus according to which an image sensor is divided into a plurality of areas and exposure control may be performed for each area according to the amount of camera shake. An imaging apparatus which is an aspect of the present disclosure includes an image sensor unit for generating pixel data of a pixel constituting a frame by photoelectric conversion, a calculation unit for calculating an amount of camera shake in each of areas obtained by dividing the frame, and a control unit for controlling exposure time of the image sensor for each of the areas according to the amount of camera shake calculated for each of the areas. The present disclosure is applicable to an electronic device such as a camera including an area ADC type image sensor, for example.

15 Claims, 10 Drawing Sheets

(51) Int. Cl.
*H04N 5/3745* (2011.01)
*H04N 5/345* (2011.01)

(52) U.S. Cl.
CPC ............ *H04N 5/345* (2013.01); *H04N 5/347* (2013.01); *H04N 5/3745* (2013.01)

(56) References Cited

U.S. PATENT DOCUMENTS

| | | | |
|---|---|---|---|
| 8,970,712 B2* | 3/2015 | Narita | H04N 5/23254 348/208.1 |
| 2006/0140600 A1* | 6/2006 | Suda | H04N 5/23248 396/52 |

FOREIGN PATENT DOCUMENTS

| | | |
|---|---|---|
| JP | 2006-197192 A | 7/2006 |
| JP | 2007-139874 A | 6/2007 |
| JP | 4771000 B2 | 9/2011 |
| JP | 2012-175234 A | 9/2012 |

* cited by examiner

EXPOSURE TIME ON EACH AREA
(WHITE: LONG EXPOSURE TIME, BLACK: SHORT EXPOSURE TIME)

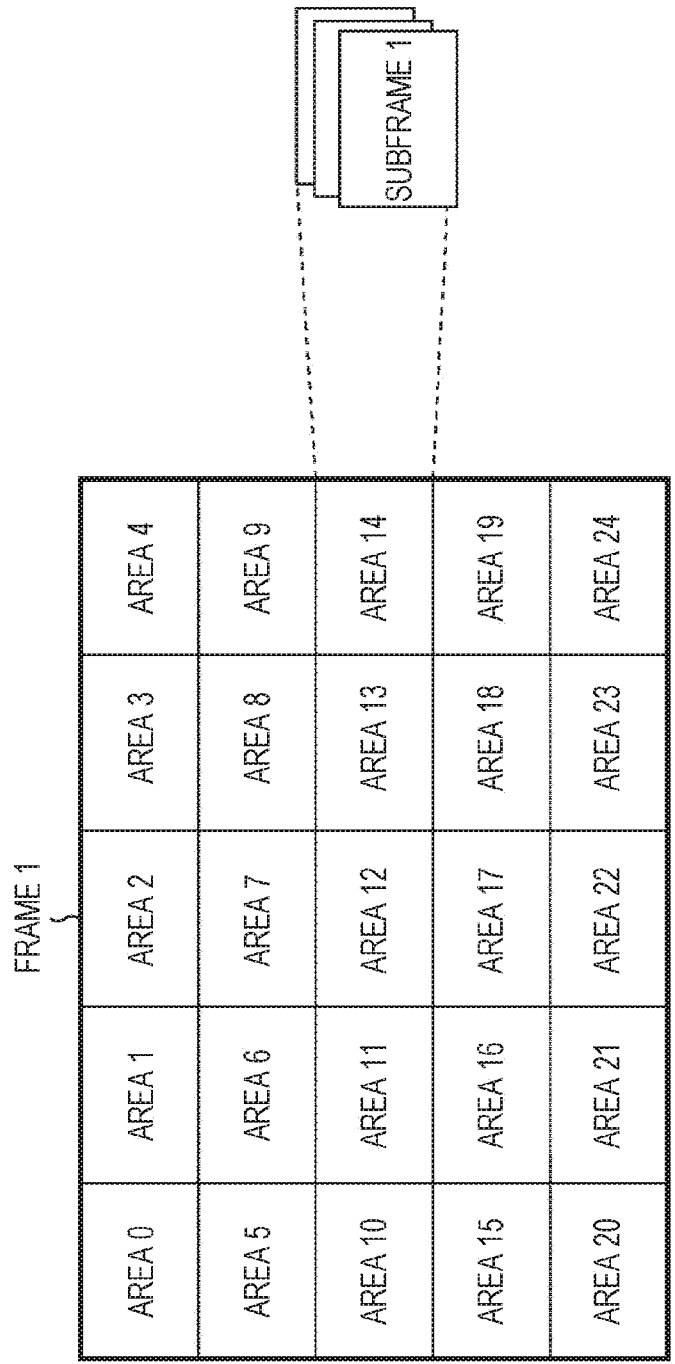

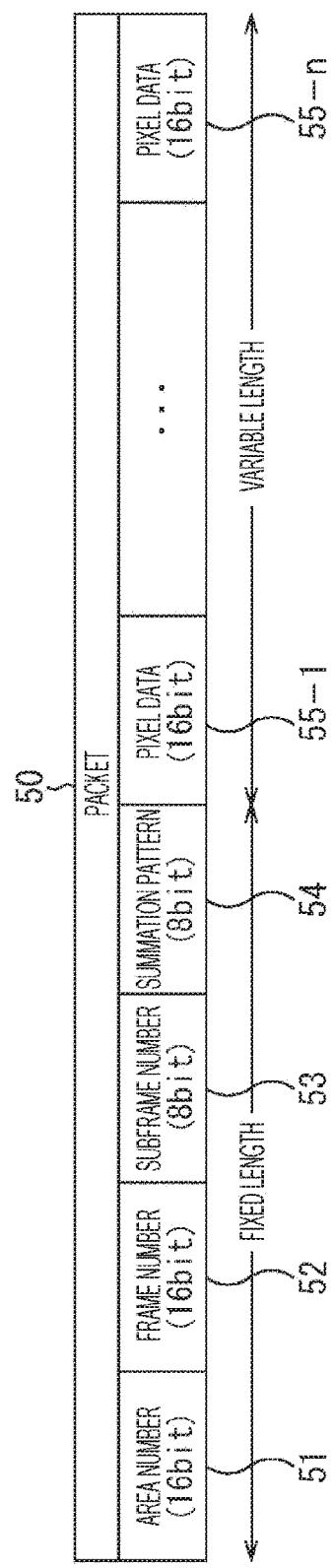

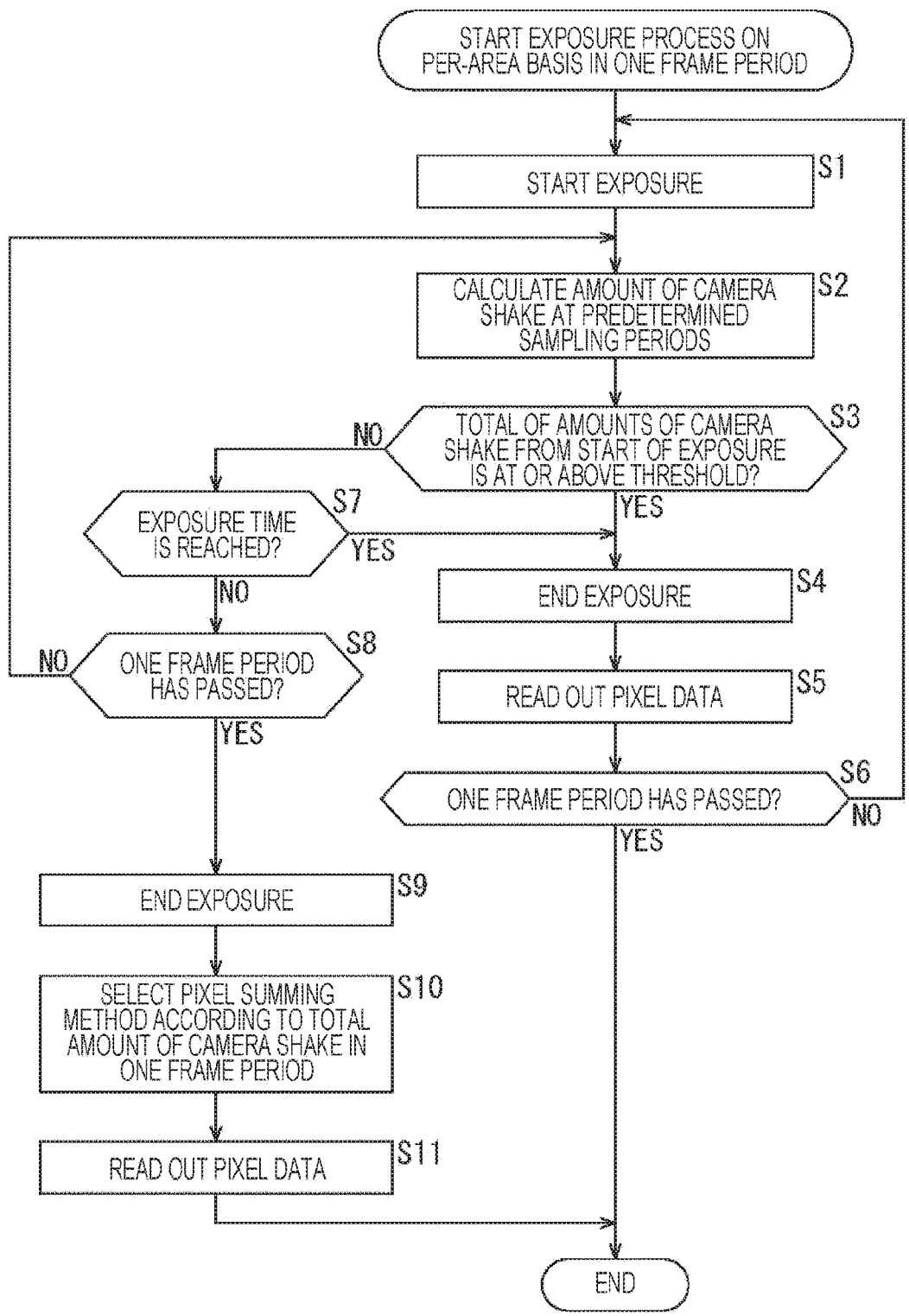

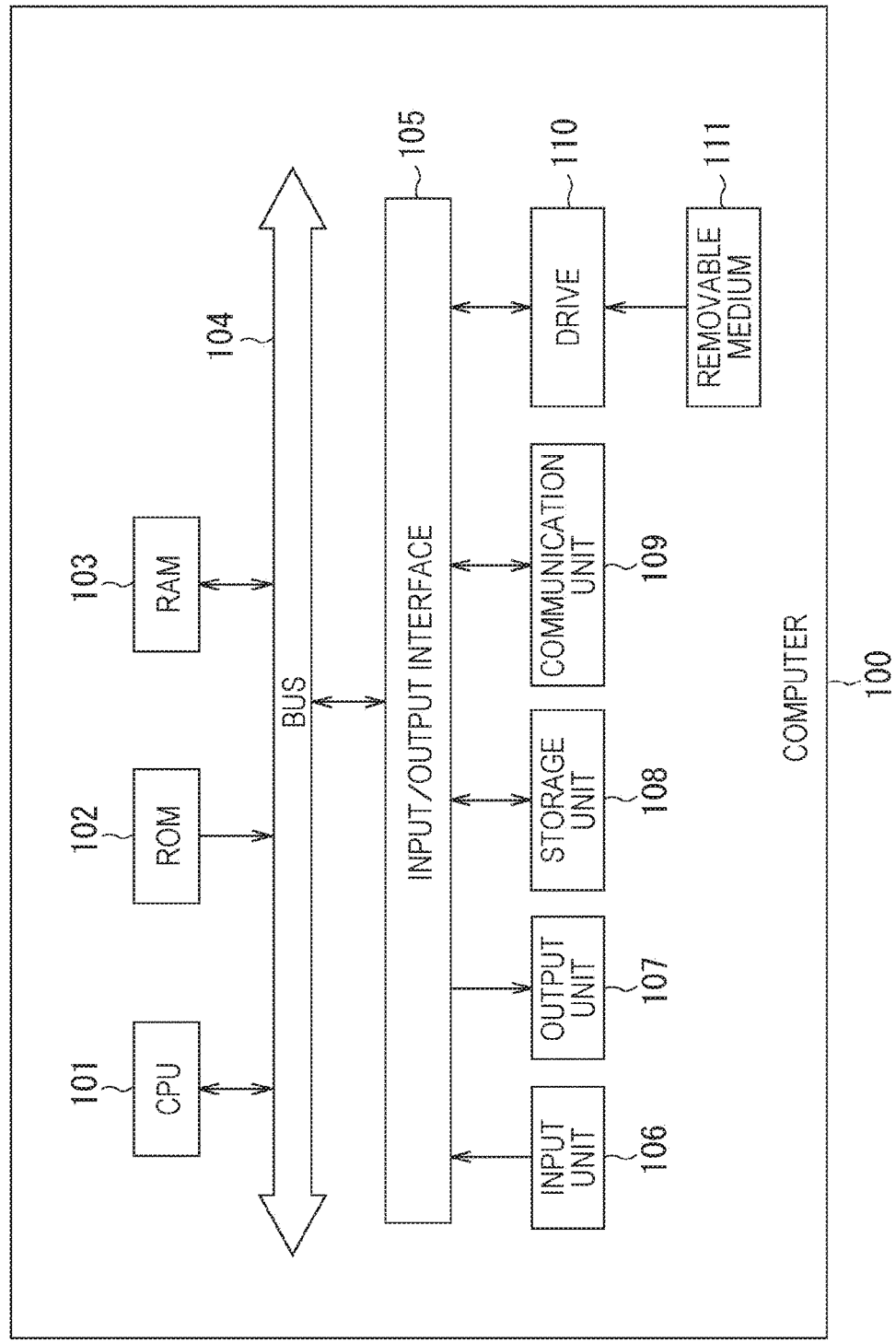

IMAGING APPARATUS, IMAGING METHOD AND PROGRAM, AND REPRODUCTION APPARATUS

CROSS REFERENCE TO RELATED APPLICATIONS

This application is a U.S. National Phase of International Patent Application No. PCT/JP2015/067945 filed on Jun. 23, 2015, which claims priority benefit of Japanese Patent Application No. JP 2014-139507 filed in the Japan Patent Office on Jul. 7, 2014. Each of the above-referenced applications is hereby incorporated herein by reference in its entirety.

TECHNICAL FIELD

The present disclosure relates to an imaging apparatus, an imaging method and a program, and a reproduction apparatus, and more particularly, to an imaging apparatus, an imaging method and a program, and a reproduction apparatus which are capable of detecting the amount of camera shake for each area in a frame that is captured, and of changing, for each area, the exposure time, the pixel summing method and the like according to the detected amount of camera shake.

BACKGROUND ART

Conventionally, as imaging apparatuses typified by digital video cameras, there are those that automatically adjust the exposure time of an image sensor or change the method of reading out pixels of the image sensor according to an imaging mode that is set. Specifically, for example, in the case where the imaging mode is set to a night scene mode, the method of reading out pixels is changed to pixel summing (a method of summing pixel values of a plurality of adjacent pixels and reading out the values as the pixel value of one pixel).

Also, there are conventional imaging apparatuses that are provided with a mechanism for detecting camera shake, and there is proposed a control method of adjusting the exposure time of an image sensor or changing the pixel summing method of the image sensor according to the detected amount of camera shake.

For example, Patent Document 1 proposes a control method according to which, when the imaging mode is set to the night scene mode, if the detected amount of camera shake is great, the number of pixels whose pixel values are to be summed in the pixel summing method is set to be great, and if the detected amount of camera shake is small, the number of pixels whose pixel values are to be summed in the pixel summing method is set to 1, for example, so that all pixel readout is performed without performing pixel summing.

According to this control method, even with the night scene mode, if the amount of camera shake is small, a high-resolution image may be obtained. On the other hand, if the mode is the night scene mode, and the amount of camera shake is great, an image for which camera shake has been corrected by pixel summing may be obtained.

However, the amount of camera shake is not necessarily uniform across the entire frame, and in the case where a frame includes an area with a great amount of camera shake and an area with a small amount of camera shake, an image with the highest possible resolution is desirably output by performing pixel summing for the area with a great amount of camera shake and performing all pixel readout for the area with a small amount of camera shake.

Additionally, in relation to control of an image sensor on a per-area basis by dividing the image sensor into a plurality of areas, for example, Patent Document 2 proposes an image sensor which allows the exposure time to be changed on a per-area basis.

CITATION LIST

Patent Document

Patent Document 1: Japanese Patent No. 4771000
Patent Document 2: Japanese Patent Application Laid-Open No. 2012-175234

SUMMARY OF THE INVENTION

Problems to be Solved by the Invention

According to the image sensor disclosed in Patent Document 2, in the case of capturing a scene with wide dynamic range, the entire screen may be captured with no saturation and no crushed shadows by reducing the exposure time for an area of a bright subject while increasing the exposure time for an area of a dark subject.

However, the image sensor does not take camera shake into account, and for example, the exposure time is increased even when there is great camera shake in an area of a dark subject, and there is a possibility that a blur that is different for each area is generated.

The present disclosure has been made in view of the above circumstance, and is for enabling exposure control according to the amount of camera shake in each area by dividing an image sensor into a plurality of areas.

Solutions to Problems

An imaging apparatus of a first aspect of the present disclosure includes: an image sensor unit for generating pixel data of a pixel constituting a frame by photoelectric conversion; a calculation unit for calculating an amount of camera shake in each of areas obtained by dividing the frame; and a control unit for controlling exposure time of the image sensor for each of the areas according to the amount of camera shake calculated for each of the areas.

The control unit may further control a pixel summing method of the image sensor unit for each of the areas according to the amount of camera shake calculated for each of the areas.

The control unit may cause exposure and pixel readout of the image sensor unit to be performed at least one time during one frame period for each of the areas according to the amount of camera shake calculated for each of the areas.

The imaging apparatus of the first aspect of the present disclosure may further include a motion sensor unit for detecting at least one of angular velocity and acceleration, where the calculation unit calculates the amount of camera shake in each of the areas on the basis of at least one of the angular velocity and the acceleration detected.

The calculation unit may calculate the amount of camera shake in each of the areas on the basis of a variance of pixel data of a plurality of pixels sampled for each of the areas.

The image sensor unit may include, for each of a plurality of regions where a plurality of pixels are arranged, one ADC that is shared by the plurality of pixels, and the area may correspond to the region where a plurality of pixels sharing one ADC are arranged.

The imaging apparatus of the first aspect of the present disclosure may further include a data output unit for generating image data by packetizing, for each area, pixel data that is read out from the image sensor unit.

The data output unit may store, in a same packet, the pixel data that is read out from a same area, and may describe an area number indicating a position of the area in a frame in the same packet.

The data output unit may further describe, in the same packet, at least one of a frame number indicating a place in a chronological order of a frame to which the area belongs, a subframe number indicating a time of performance among several times, in a case where exposure and readout have been performed several times for the area in one frame period, and a summation pattern indicating a pixel summing method for the area.

The imaging apparatus of the first aspect of the present disclosure may further include a re-synthesis unit for re-synthesizing the frame on the basis of the image data, generated by the data output unit, in which the pixel data is packetized on a per-area basis.

An imaging method of the first aspect of the present disclosure to be performed by an imaging apparatus including an image sensor unit for generating pixel data of a pixel constituting a frame by photoelectric conversion, the method includes: calculating an amount of camera shake in each of areas obtained by dividing the frame; and controlling exposure time of the image sensor for each of the areas according to the amount of camera shake calculated for each of the areas.

A program of the first aspect of the present disclosure for controlling an imaging apparatus including an image sensor unit for generating pixel data of a pixel constituting a frame by photoelectric conversion, the program is for causing a computer of the imaging apparatus to perform: calculating an amount of camera shake in each of areas obtained by dividing the frame; and controlling exposure time of the image sensor for each of the areas according to the amount of camera shake calculated for each of the areas.

According to the first aspect of the present disclosure, the amount of camera shake in each of areas obtained by dividing the frame is calculated, and the exposure time of the image sensor is controlled for each of the areas according to the amount of camera shake calculated for each of the areas.

A reproduction apparatus of the second aspect of the present disclosure is a reproduction apparatus for reproducing image data that is output from an imaging apparatus including an image sensor unit for generating pixel data of a pixel constituting a frame by photoelectric conversion, a calculation unit for calculating an amount of camera shake in each of areas obtained by dividing the frame, a control unit for controlling exposure time of the image sensor for each of the areas according to the amount of camera shake calculated for each of the areas, and a data output unit for generating the image data by packetizing, for each area, pixel data that is read out from the image sensor unit, the reproduction apparatus including: an acquisition unit for acquiring the image data in units of a packet; and a restoration unit for analyzing a packet of the acquired image data, and restoring the frame on the basis of each area corresponding to the packet.

The packet of the image data may store the pixel data that is read out from a same area, and an area number indicating a position of the area in a frame may be described in the packet.

At least one of a frame number indicating a place in a chronological order of a frame to which the area belongs, a subframe number indicating a time of performance among several times, in a case where exposure and readout have been performed several times for the area in one frame period, and a summation pattern indicating a pixel summing method for the area may be further described in the packet of the image data.

According to the second aspect of the present disclosure, image data is acquired in units of a packet, a packet of acquired image data is analyzed, and the frame is restored on the basis of each area corresponding to the packet.

Effects of the Invention

According to the first aspect of the present disclosure, exposure is controlled for each area according to the amount of camera shake.

According to the second aspect of the present disclosure, a frame may be restored from image data that is packetized on a per-area basis.

BRIEF DESCRIPTION OF DRAWINGS

FIG. 7 is a diagram for describing a relationship among a frame number, area numbers, and subframe numbers.

FIG. 8 is a diagram showing a data structure of a pixel data packet.

FIG. 9 is a flowchart describing an exposure process performed for each area.

FIG. 10 is a block diagram showing an example configuration of a computer.

MODE FOR CARRYING OUT THE INVENTION

Hereinafter, a preferred embodiment for carrying out the present disclosure (hereinafter referred to as an embodiment) will be described in detail with reference to the drawings.

<Example Configuration of Imaging Apparatus as Present Embodiment>

Figure 1:
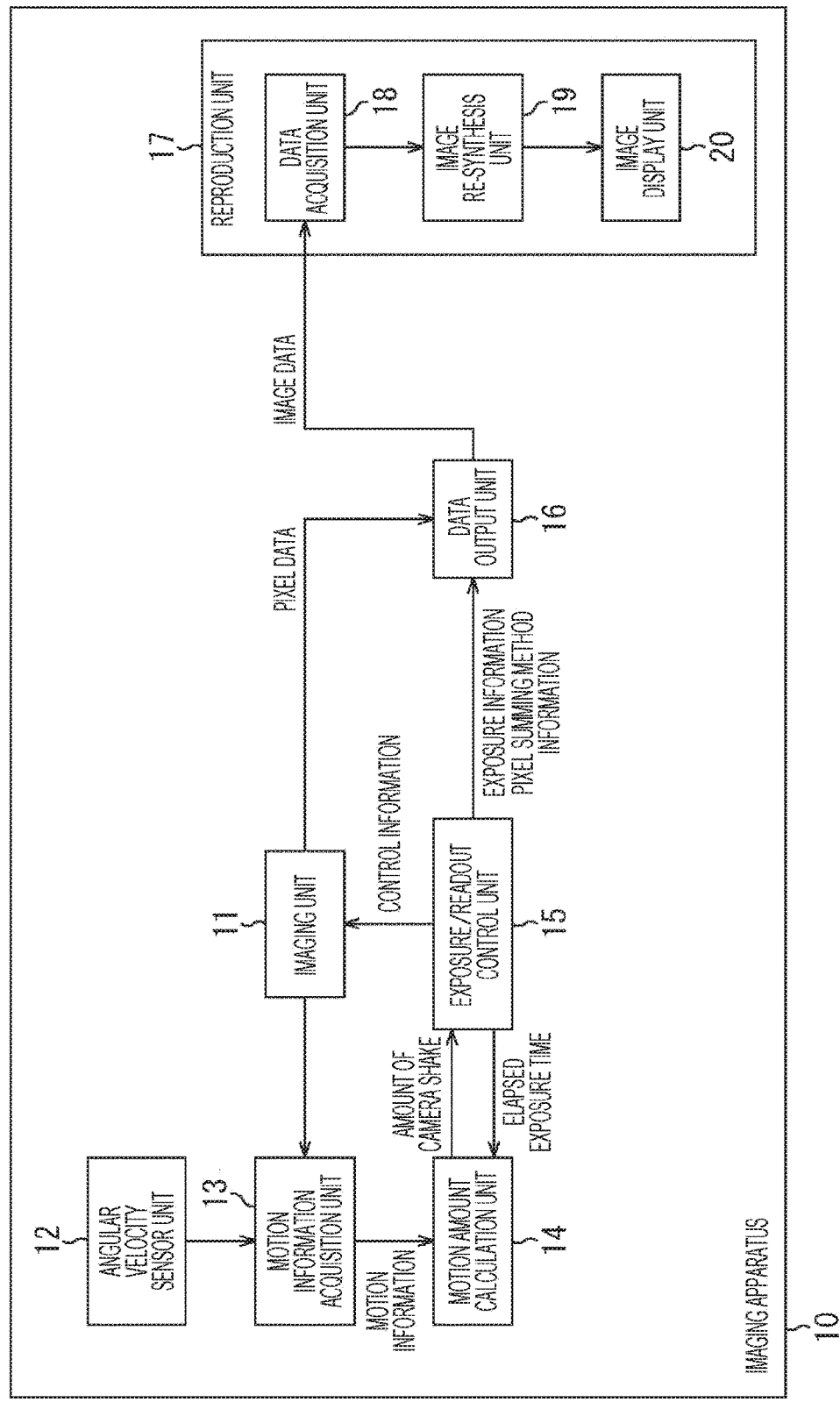
FIG. 1 is a block diagram showing an example configuration of an imaging apparatus to which the present disclosure is applied.

FIG. 1 shows an example configuration of an imaging apparatus which is a present embodiment. An imaging apparatus 10 is for capturing a moving image at a predetermined frame rate, and specifically, electronic devices such as digital still cameras and smartphones having a moving image capturing function are conceivable in addition to digital video cameras. However, the present disclosure is also applicable in the case of capturing a still image.

The imaging apparatus 10 includes an imaging unit 11, an angular velocity sensor unit 12, a motion information acquisition unit 13, a motion amount calculation unit 14, an exposure/readout control unit 15, a data output unit 16, and a reproduction unit 17.

The imaging unit 11 performs capturing at a predetermined frame rate according to control information from the exposure/readout control unit 15, and supplies pixel data that is obtained as a result to the data output unit 16. Additionally, at the time of capturing, the exposure time and the pixel summing method may be changed for each of a plurality of areas obtained by dividing a frame.

Furthermore, the imaging unit 11 supplies the generated pixel data in response to a request from the motion information acquisition unit 13. However, it is not necessary to supply pixel data of the entire frame to the motion information acquisition unit 13, and it is sufficient if only N pixels in each of a plurality of areas obtained by dividing the frame are exposed several times during a one frame period (for example, 1/30 s when the frame rate is 30 fps), and pixel data is read out and supplied to the motion information acquisition unit 13 at each exposure.

The angular velocity sensor unit 12 detects the motion of the imaging apparatus 10 during capturing by detecting, at predetermined sampling periods, angular velocity around each of three axes (x-axis, y-axis, z-axis) that pass through center coordinates of the frame, that is, the center of an image sensor 32, and that are orthogonal to one another. Additionally, an accelerometer for detecting acceleration in directions of three axes may be mounted in addition to the angular velocity sensor unit 12 or instead of the angular velocity sensor unit 12.

The motion information acquisition unit 13 performs at least one of a process for acquiring pixel data from the imaging unit 11 and a process for acquiring angular velocity detected by the angular velocity sensor unit 12, and supplies at least one of the acquired pixel data or angular velocity to the motion amount calculation unit 14 as motion information.

The motion amount calculation unit 14 calculates the amount of camera shake in each area on the frame on the basis of the motion information from the motion information acquisition unit 13, and notifies the exposure/readout control unit 15 of the amount. Additionally, details of calculation of the amount of camera shake based on the motion information will be given later.

The exposure/readout control unit 15 determines the exposure time and the pixel summing method for each area on the basis of the amount of camera shake in each area of the frame supplied by the motion amount calculation unit 14, and notifies the imaging unit 11 of the above as control information. Here, as the pixel summing method, horizontal direction ½, horizontal direction ¼, vertical direction ⅛ or the like may be selected. Additionally, control may be performed such that pixels are simply thinned and read out, instead of pixel summing.

Moreover, the exposure/readout control unit 15 also notifies the data output unit 16 of the exposure time and the pixel summing method for each area which have been determined. Furthermore, the exposure/readout control unit 15 notifies the motion amount calculation unit 14 of the elapsed time of exposure based on the determined exposure time for each area.

The data output unit 16 generates image data by packetizing the pixel data input from the imaging unit 11 for each area of the frame. Details of the data structure (hereinafter referred to as a pixel data format) of a packet storing the pixel data will be given later.

The data output unit 16 outputs the generated image data to the reproduction unit 17 on a per-packet basis. Additionally, the order of output of packets of the image data from the data output unit 16 to the reproduction unit 17 is arbitrary, and does not necessarily have to follow a predetermined order (for example, in the order of raster scanning in units of an area).

The reproduction unit 17 is configured from a data acquisition unit 18, an image re-synthesis unit 19, and an image display unit 20.

The data acquisition unit 18 acquires, and temporarily holds, a packet of image data that is output from the data output unit 16, analyzes the area number, the frame number and the like stored in the packet, and notifies the image re-synthesis unit 19 of the analysis result. Furthermore, the data acquisition unit 18 supplies the packet of image data that is held to the image re-synthesis unit 19 in response to a request from the image re-synthesis unit 19.

The image re-synthesis unit 19 re-synthesizes pixel data of the area stored in the packet supplied by the data acquisition unit 18 into image data on a per-frame basis, and outputs the data to the image display unit 20. The image display unit 20 displays the re-synthesized image data as an image.

Additionally, the reproduction unit 17 may also exist as a reproduction apparatus separate from the imaging apparatus 10.

<Detailed Example Configuration of Imaging Unit 11>

Next, a detailed example configuration of the imaging unit 11 will be described with reference to FIGS. 2 and 3.

Figure 2:
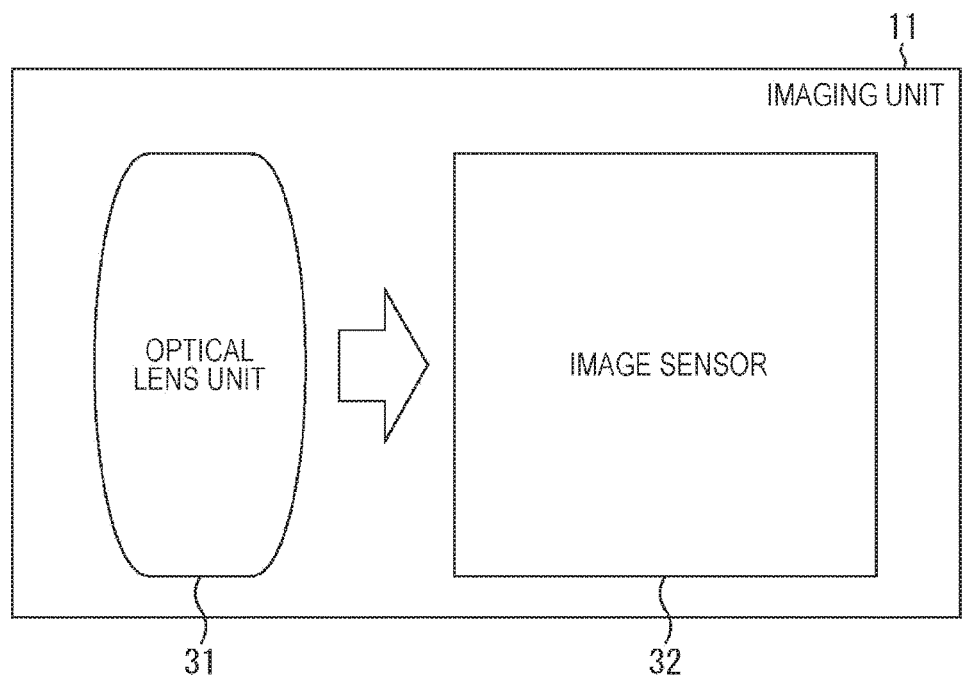
FIG. 2 is a block diagram showing an example configuration of an imaging unit.

FIG. 2 shows an example configuration of the imaging unit 11. That is, the imaging unit 11 includes an optical lens unit 31, and an image sensor 32. The optical lens unit 31 condenses an optical image of a subject on the image sensor 32. The image sensor 32 is configured from a solid state image sensor such as a CMOS, and generates pixel data according to incident light by photoelectric conversion.

Figure 3:
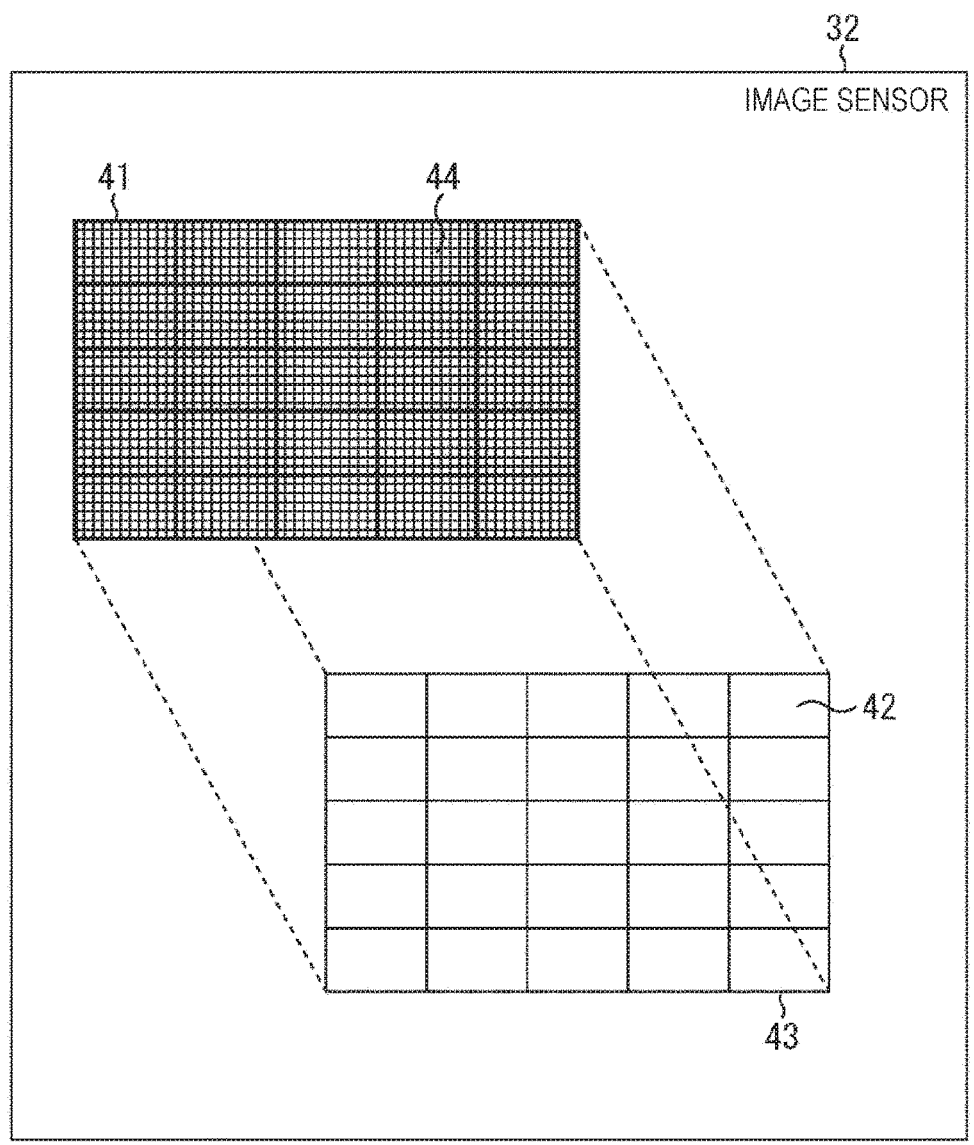
FIG. 3 is a block diagram showing an example configuration of an image sensor.

FIG. 3 shows an example configuration of the image sensor 32. The image sensor 32 includes a pixel unit 41 formed from several millions of pixels, and an analog digital converter (ADC) group 43 formed from a plurality of ADCs 42. The pixel unit 41 is divided into areas 44 each formed from a plurality of pixels that are arranged vertically and horizontally, and a plurality of pixels belonging to one area 44 share one ADC 42. That is, in the present embodiment, the amount of camera shake is calculated for one area 44 where one ADC 42 is shared, and the exposure time and the pixel summing method for each area 44 are set according to the amount of camera shake.

However, the present disclosure is also applicable in a case where the area 44 and a region on the image sensor 32 where one ADC 42 is shared do not always coincide with each other.

<Calculation of Amount of Camera Shake Based on Motion Information>

Next, calculation of the amount of camera shake based on the motion information by the motion amount calculation unit 14 will be described.

Figure 4:
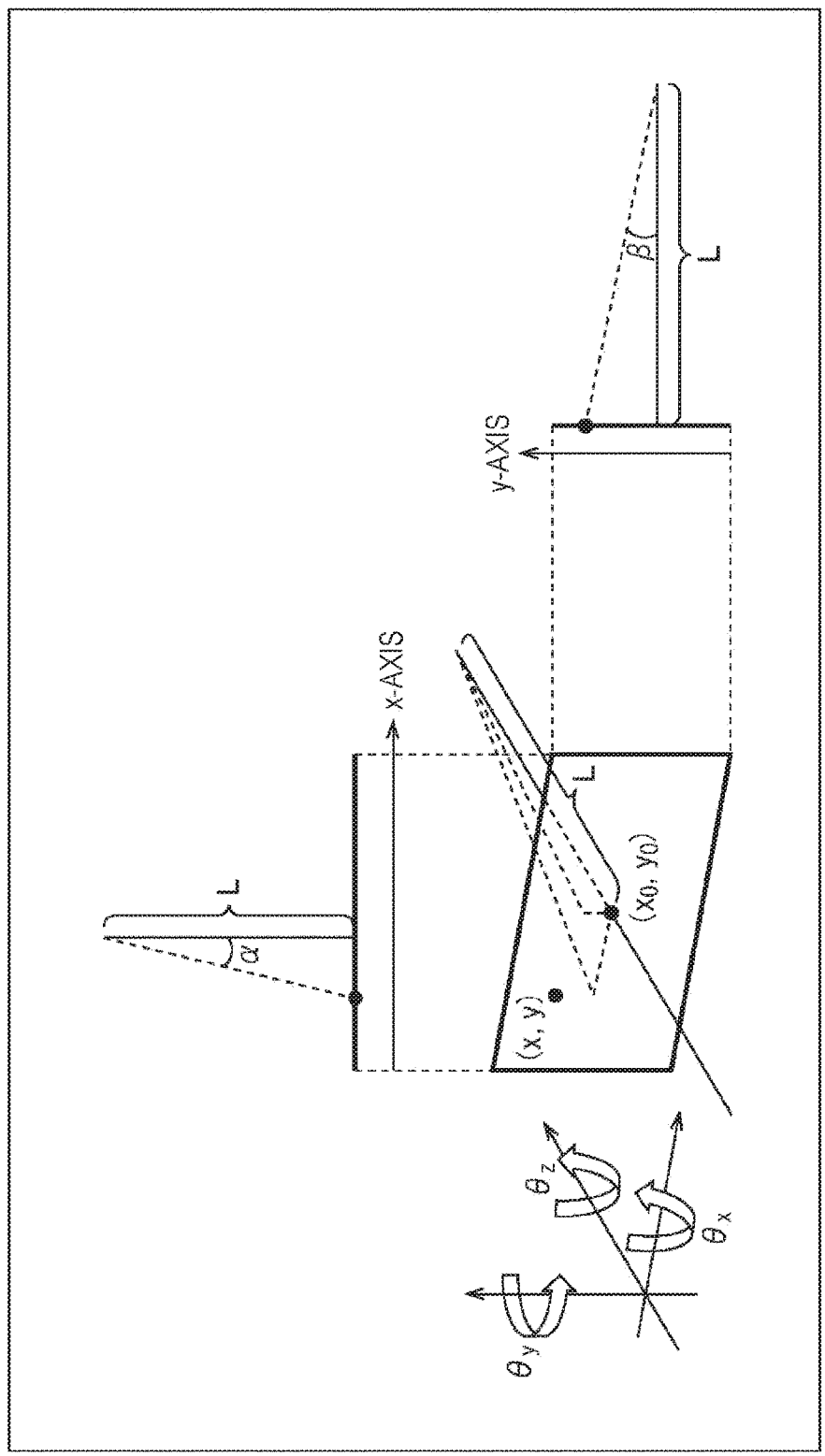
FIG. 4 is a diagram for describing generation of motion information based on angular velocity.

First, calculation of the amount of camera shake based on the angular velocity will be described. FIG. 4 shows a relationship between the amount of camera shake and rotation angles (pitch angle $\theta x$, yaw angle $\theta y$, roll angle $\theta z$) based on angular velocities, detected by the angular velocity sensor unit 12, around three axes (x-axis, y-axis, z-axis) that pass through the center coordinates of the image sensor 32 and that are orthogonal to one another.

Additionally, in FIG. 4, (x, y) are coordinates in an area. The center coordinates of a frame are given as (X, Y). The focal length of the image sensor 32 is given as L. The x and y direction angles of a pixel position are given as (α, β), and pitch around the X-axis, yaw around the Y-axis, and roll around the Z-axis are given as ($\theta_x$, $\theta_y$, $\theta_z$).

The motion amount calculation unit 14 calculates rotation angles ($\theta_x$, $\theta_y$, $\theta_z$) by integrating the angular velocities around the three axes detected by the angular velocity sensor unit 12, and computes, according to the following formulae (1), an amount of camera shake ($d_x$, $d_y$) at the center coordinates (x, y) of each area at the timing of acquisition of the angular velocities by using the calculated rotation angles ($\theta_x$, $\theta_y$, $\theta_z$), the focal point M and the length L.

[Mathematical Formula 1]

$$d_x = x - \left\{ X + \left( \frac{\cos\alpha}{\cos(\alpha + \theta_x)} X - X \right) + (L\tan(\beta + \theta_y) - X) + ((X\cos\theta_z - Y\sin\theta_z) - X) \right\} \quad (1)$$

$$d_y = y - \left\{ Y + (L\tan(\alpha + \theta_x) - Y) + \left( \frac{\cos\beta}{\cos(\beta + \theta_y)} Y - Y \right) + ((X\sin\theta_z + Y\cos\theta_z) - Y) \right\}$$

Next, calculation of the amount of camera shake based on variances of N pieces of pixel data acquired from each area will be described.

Normally, the variance of pixel data in each area is determined by the noise at the image sensor 32 and the pattern indicating the feature of a subject, but in the case where there is occurrence of camera shake, the pattern of the subject is lost, and thus, the variance tends to be smaller compared to the case where there is no occurrence of camera shake. Accordingly, in the present embodiment, the variance of pixel data in each area is calculated, and presence/absence of camera shake and the amount of camera shake are determined based on the result of comparison between the variance and a predetermined threshold. Additionally, the threshold may be determined on the basis of a noise model for the image sensor 32 and ISO sensitivity settings.

Specifically, first, N pixels are sampled from each area, and exposure is performed several times during one frame period T, and a plurality of pieces of pixel data for the same coordinates are acquired. Here, pixel data at a timing $t_j$ of an i-th pixel among the N pieces of pixel data is expressed by $p_i(t_j)$. Next, the pixel data $p_i(t_j)$ is accumulated according to the following formula (2) from timings t=1 to t=$t_j$, and an accumulated pixel value $p_{i,j}$ is calculated.

[Mathematical Formula 2]

$$\overline{p_{i,j}} = \sum_{t=1}^{t_j} p_i(t_j) \quad (2)$$

Next, an average value $p_j$ of the accumulated pixel value $p_{i,j}$ of the N pixels in the area is calculated according to the following formula (3).

[Mathematical Formula 3]

$$\overline{p_j} = \frac{\sum_{i=1}^{N} \overline{p_{i,j}}}{N} \quad (3)$$

Next, according to the following formula (4), a variance $v_j$ of pixel data at the timing t=$t_j$ of the N pixels in the area is calculated.

[Mathematical Formula 4]

$$v_j = \frac{\sum_{i=1}^{N} (p_i - \overline{p_j})^2}{N} \quad (4)$$

Lastly, the calculated variance $v_j$ and the predetermined threshold are compared, and if the variance $v_j$ is smaller than the predetermined threshold, occurrence of camera shake is determined, and the variance $v_j$ is further compared with a plurality of lower thresholds to determine the amount of camera shake.

Additionally, in the case where the process for acquiring pixel data from the imaging unit 11 and the process for acquiring angular velocity detected by the angular velocity sensor unit 12 are performed by the motion information acquisition unit 13, the amount of camera shake may be calculated by the motion amount calculation unit 14 by preferentially using one of the above. Moreover, the amount of camera shake may be calculated from each one, and each calculation result may be multiplied by a predetermined weight coefficient, and then, addition may be performed.

<Control of Exposure Time and Pixel Summing Method Based on Amount of Camera Shake in Each Area>

Next, control of the exposure time and the pixel summing method based on the amount of camera shake in each area by the exposure/readout control unit 15 will be described.

Figure 5A:
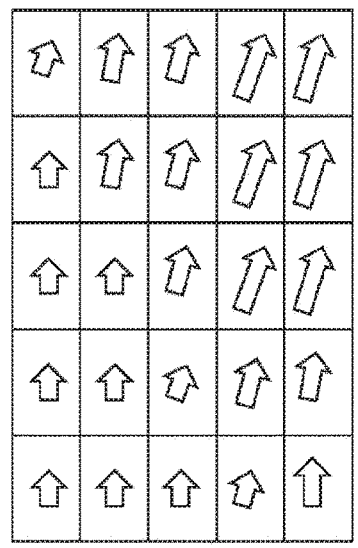
FIGS. 5A, 5B and 5C are a diagram describing setting of exposure time according to the amount of camera shake in each area.
Figure 5B:
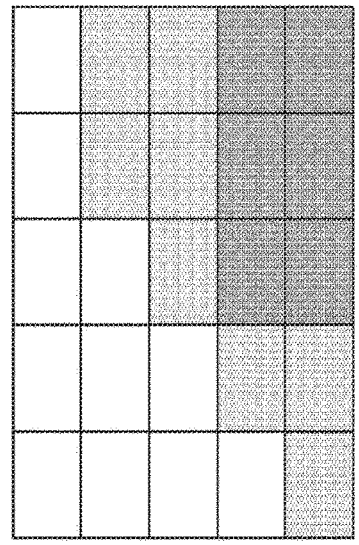
Figure 5C:
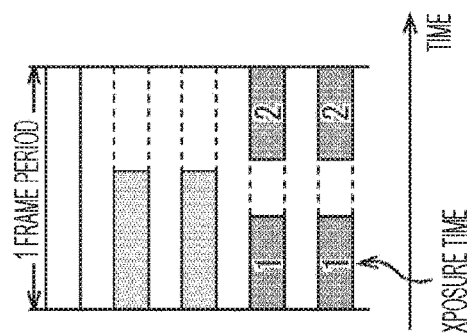

FIGS. 5A, 5b and 5C are a diagram for describing control of the exposure time based on the amount of camera shake in each area. For example, as shown in FIG. 5A, when the amount of camera shake in each area is calculated by the motion amount calculation unit 14, the exposure time is set for each area according to the size of the amount. In the case of the present drawing, each area is set as one of an area with a long exposure time, an area with a short exposure time, and an area with an even shorter exposure time where exposure and output of pixel data are performed twice. Additionally, options for setting of the exposure time according to the amount of camera shake are not limited to the three types described above, and may be more finely divided. Also, there may be provided an area where exposure and output of pixel data are performed three or more times.

Figures 6A, 6B:
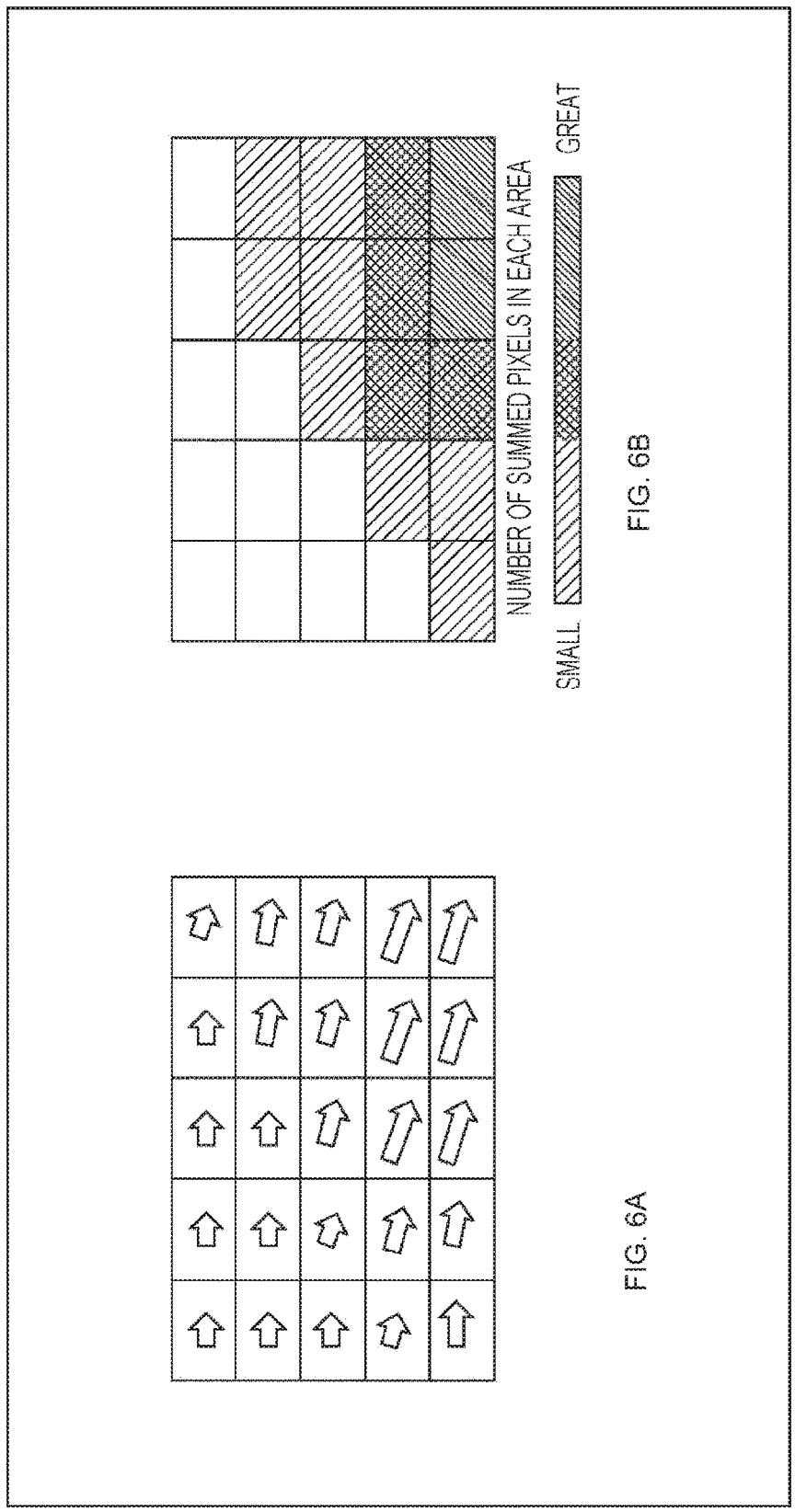
FIGS. 6A and 6B are a diagram describing pixel summing according to the amount of camera shake in each area.

FIGS. 6A and 6B are a diagram for describing control of the pixel summing method based on the amount of camera shake in each area. For example, as shown in FIG. 6A, when the amount of camera shake in each area is calculated by the motion amount calculation unit 14, the pixel summing method (the number of summed pixels) is set for each area according to the size of the amount. In the case of the present drawing, each area is set as one of four types of pixel summing methods with different numbers of summed pixels. Additionally, options for setting of the pixel summing method according to the amount of camera shake are not limited to four types, and there may be more or less options.

<Pixel Data Format>

Next, the data structure (pixel data format) of a packet of image data that is output from the data output unit 16 will be described with reference to FIGS. 7 and 8.

FIG. 7 is a diagram showing a relationship among a frame, areas, and subframes. Frame numbers are assigned to frames in the chronological order. Frame numbers indicating positions of areas in a frame are assigned to respective areas obtained by dividing the frame. Subframe numbers are assigned to an area where exposure and readout were performed several times, one for each time.

Additionally, the shape of an area does not necessarily has to be fixed, and may be dynamically changed.

FIG. 8 shows a pixel data format of a packet of pixel data. A packet 50 is generated for each area.

The packet 50 includes an area number region 51, a frame number region 52, a subframe number region 53, and a summation pattern region 54. Bit width is set for each of the area number region 51 to the summation pattern region 54, and thus, the data length from the area number region 51 to the summation pattern region 54 is a fixed length.

The packet 50 includes a plurality of pixel data regions 55-1 to 55-n. Additionally, the number of pixels to be read out from an area may be changed depending on the pixel summing method (the number of summed pixels) that is set, and thus, the data length of the pixel data regions 55-1 to 55-n is a variable length.

The area number region 51 stores the area number indicating the position of an area in the frame. The frame number region 52 stores the frame number indicating the place in the chronological order of a frame including the area corresponding to the packet 50. The subframe number region 53 stores the subframe number indicating in which turn the shooting was performed. The summation pattern region 54 stores information indicating the pattern of the pixel summing method that is set for the area corresponding to the packet 50. Additionally, the pattern of the pixel summing method also includes information for a case where the area shape was dynamically changed.

The pixel data region 55 stores pixel data of a pixel that is read out from the area corresponding to the packet 50. For example, in the case where two pixels are read out from the corresponding area, pixel data regions 55-1 and 55-2 are provided, and pixel data after pixel summing is stored in each pixel data region. Also, for example, if no pixel is read out from the corresponding area, the pixel data region 55 is not provided. In this case, information that no pixel is read out from the corresponding area is stored in the summation pattern region 54 as the information indicating the pattern of the pixel summing method.

The reproduction unit 17, which receives the packet 50, may specify the coordinates of the pixel in the pixel data stored in the pixel data region 55 on the basis of the area number, the frame number, the subframe number, and the pattern of the pixel summing method. Accordingly, even if the output order of the packets 50 is not in the order of raster scanning or the chronological order and is random, frames may be accurately restored at the reproduction unit 17.

As shown in FIG. 8, because the pixel data regions 55-1 to 55-n of the pixel data format have variable lengths, the number of summed pixels is increased when the amount of camera shake is great, and for an area where the number of pixels to be read out is small, the amount of data of the corresponding packet may be reduced. Accordingly, image data may be efficiently transferred from the data output unit 16 to the later stage.

Additionally, in FIG. 8, the bit width (for example, 16 bit) of each region is described, but this is only exemplary, and the width may be changed according to the configuration of the image sensor 32.

<Exposure Process on Per-Area Basis in One Frame Period>

Next, FIG. 9 is a flow chart describing an exposure process performed for each area in one frame period.

The exposure process is performed for each of a plurality of areas forming a frame, in each one frame period.

In step S1, the imaging unit 11 starts exposure on a current area unit 15. Additionally, the exposure time of exposure that is started here is a time that is uniformly set for all the areas on the basis of the brightness or the like of the entire frame.

In step S2, the motion amount calculation unit 14 calculates the amount of camera shake at predetermined sampling periods for the current area on the basis of motion information from the motion information acquisition unit 13, and notifies the exposure/readout control unit 15 of the amounts.

In step S3, the exposure/readout control unit 15 determines whether the total of the amounts of camera shake from the start of exposure is at or above a predetermined threshold. If it is determined here that the total of the amounts of camera shake from the start of exposure is at or above the predetermined threshold, the exposure is instantly stopped, and the process proceeds to step S4.

In step S4, the imaging unit 11 ends exposure on the current area unit 15. In step S5, the imaging unit 11 reads out pixel data from the current area by the pixel summing method corresponding to the control information from the exposure/readout control unit 15, and outputs the data to the data output unit 16. Additionally, in the case where the pixel summing method for the area is not yet set, all the pixels in the area are read out.

In step S6, the exposure/readout control unit 15 determines whether or not one frame period has passed from the start of the exposure process. In the case where one frame period has not passed, exposure is to be performed several times for the same area in one frame period, and the process returns to step S1 to be repeated. On the other hand, in the case where one frame period has passed, the exposure process is ended.

Additionally, in the case where the total of the amounts of camera shake from the start of exposure is determined in step S3 to be smaller than the predetermined threshold, the process proceeds to step S7. In step S7, the exposure/readout control unit 15 determines whether or not the exposure time that is set has been reached from the start of exposure in step S1. If it is determined here that the exposure time is reached, the exposure is ended, and the process proceeds to step S4. On the other hand, if it is determined that the exposure time is not yet reached, the process proceeds to step S8.

In step S8, the exposure/readout control unit 15 determines whether or not one frame period has passed from the start of the exposure process. In the case where one frame period has not passed, the process is returned to step S2 to be repeated while the exposure is being continued. On the other hand, in the case where one frame period has passed, the process proceeds to step S9.

In step S9, the imaging unit 11 ends exposure on the current area according to control information from the exposure/readout control unit 15. In step S10, the exposure/readout control unit 15 determines the pixel summing method for the current area according to the total amount of camera shake in one frame period, and notifies the imaging unit 11 of the method as control information.

In step S11, the imaging unit 11 reads out pixel data of the current area according to the control information (pixel summing method) from the exposure/readout control unit 15, and outputs the data to the data output unit 16. The exposure process is then ended.

As described above, according to the exposure process that is performed on a per-area basis in one frame period, the exposure time may be secured for a current area up to the limit at which the amount of camera shake from the start of exposure reaches the predetermined threshold, and the SNR may be improved.

Furthermore, exposure is immediately stopped if the total of the amounts of camera shake from the start of exposure is great (at or above the predetermined threshold), and the influence of camera shake on the area may be suppressed. Moreover, the pixel summing method of a current area is determined according to the total amount of camera shake in one frame period, and thus, if the camera shake is small, the SNR may be improved and the power may be saved while maintaining the resolution. On the other hand, if the camera shake is great, the resolution is reduced and the sensitivity is increased by increasing the number of pixels to be summed up. In the case where the sensitivity is increased, the exposure time may be reduced, and the influence of camera shake may be suppressed.

<Re-Synthesis of Frame by Reproduction Unit 17>

Next, re-synthesis of a frame at the reproduction unit 17 receiving packets of image data will be described.

As described above, in the present embodiment, the number of pixels is small in a blurry area where the amount of camera shake is great, and even if pixels in an area are restored by simple linear interpolation, the frame is not greatly deteriorated as a whole.

Accordingly, the reproduction unit 17 restores pixels in an area by a linear interpolation formula as indicated by the following formula (5).

[Mathematical Formula 5]

$$p(x, c) = \frac{\sum_{u \in S} w(d(x, u)) \cdot p(u, c)}{\sum_{u \in S} w(d(x, u))} \quad (5)$$

Additionally, in formula (5), x is pixel coordinates to be restored. Pixel coordinates where there is an output are expressed by u. A color filter identifier for x or u is expressed by c. The distance between coordinates x and u is expressed by d(x, u). A weighting function that is determined according to the distance is expressed by w(d). A collection of pixel coordinates where there are outputs from the area is expressed by S.

By using formula (5), pixels in an area may be linearly interpolated by using a weighting function that is determined by the distance between a pixel to be restored and a pixel which has been actually output.

Additionally, besides formula (5), sparse coding using a dictionary or sparse coding without a dictionary may be used on the basis of sparsity of the image in order to restore pixels in an area.

Next, an example of sparse coding using a dictionary will be given by the following formula (6).

[Mathematical Formula 6]

$$p = \underset{p}{\mathrm{argmin}}\{\|s - D\alpha\|_2^2 + \|\alpha\|_k\} \quad (6)$$

Additionally, in formula (6), s is a vector of every pixel data output from the area. Learning data that is obtained in advance is expressed by D. A mask vector indicating the position of a pixel output from the area is expressed by α. A vector of every restored pixel data in the area is expressed by p. Norm used in the sparse coding is expressed by κ, and 0,1 is often used.

An example of sparse coding not using a dictionary will be given by the following formula (7).

[Mathematical Formula 7]

$$p^* = \underset{p}{\mathrm{argmin}}\{\|s - Ap\|_2^2 + \|p\|_k\} \quad (7)$$

In formula (7), s is a vector of every pixel data output from the area. A mask matrix indicating the position of a pixel output from the area is expressed by A. A vector of every restored pixel data in the area is expressed by p. Norm used in the sparse coding is expressed by κ, and 0,1 is often used.

The methods for re-synthesizing a frame from packets of image data are not limited to those based on formulae (5) to (7) described above, and any formula or method may be used.

Additionally, in the case where a packet corresponding to an area constituting a frame is not supplied to the reproduction unit 17 before the reproduction time of the frame, pixel data is generated for all the pixels in the area by a predetermined error process. As the predetermined error process, a method of using the pixel data of the area at the same position but in the previous frame, or a method of painting all the pixels in an area where the corresponding packets are not received by the same pixel data by using the pixel data of an adjacent area in the same frame may be adopted, for example.

Now, the series of processes described above may be performed by hardware, or by software. In the case of performing the series of processes by software, programs constituting the software are installed in a computer. The computer here may be a computer in which dedicated hardware is built, or a general-purpose personal computer that is capable of executing various functions by installing various programs, for example.

FIG. 10 is a block diagram showing an example configuration of hardware of a computer that performs the series of processes described above by programs.

In the computer, a central processing unit (CPU) 101, a read only memory (ROM) 102, and a random access memory (RAM) 103 are interconnected by a bus 104.

An input/output interface 105 is further connected to the bus 104. An input unit 106, an output unit 107, a storage unit 108, a communication unit 109, and a drive 110 are connected to the input/output interface 105.

The input unit 106 is configured from a keyboard, a mouse, a microphone, or the like. The output unit 107 is configured from a display, a speaker, or the like. The storage unit 108 is configured from a hard disk, a non-volatile memory, or the like. The communication unit 109 is configured by a network interface, or the like. The drive 110 drives a removable medium 111 such as a magnetic disk, an optical disk, a magneto-optical disk, a semiconductor memory, or the like.

A computer 100 configured in the above manner performs the series of processes described above by the CPU 101 loading a program that is stored in the storage unit 108 in the RAM 103 through the input/output interface 105 and the bus 104 and executing the program, for example.

Additionally, the program to be executed by the computer 100 may be a program by which processes are performed in the chronological order described in the present specification, or a program by which processes are performed in parallel or at necessary timings, such as when invoked, for example.

The embodiment of the present disclosure is not limited to the embodiment described above, and various changes may be made within the scope of the present disclosure.

Additionally, the present disclosure may also adopt the following configurations.

(1)
An imaging apparatus including:
an image sensor unit for generating pixel data of a pixel constituting a frame by photoelectric conversion;
a calculation unit for calculating an amount of camera shake in each of areas obtained by dividing the frame; and
a control unit for controlling exposure time of the image sensor for each of the areas according to the amount of camera shake calculated for each of the areas.

(2)
The imaging apparatus according to (1), wherein the control unit further controls a pixel summing method of the image sensor unit for each of the areas according to the amount of camera shake calculated for each of the areas.

(3)
The imaging apparatus according to (1) or (2), wherein the control unit causes exposure and pixel readout of the image sensor unit to be performed at least one time during one frame period for each of the areas according to the amount of camera shake calculated for each of the areas.

(4)
The imaging apparatus according to any of (1) to (3), further including a motion sensor unit for detecting at least one of angular velocity and acceleration,
wherein the calculation unit calculates the amount of camera shake in each of the areas on the basis of at least one of the angular velocity and the acceleration detected.

(5)
The imaging apparatus according to any of (1) to (4), wherein the calculation unit calculates the amount of camera shake in each of the areas on the basis of a variance of pixel data of a plurality of pixels sampled for each of the areas.

(6)
The imaging apparatus according to any of (1) to (5),
wherein the image sensor unit includes, for each of a plurality of regions where a plurality of pixels are arranged, one ADC that is shared by the plurality of pixels, and
the area corresponds to the region where a plurality of pixels sharing one ADC are arranged.

(7)
The imaging apparatus according to any of (1) to (6), further including a data output unit for generating image data by packetizing, for each area, pixel data that is read out from the image sensor unit.

(8)
The imaging apparatus according to (7), wherein the data output unit stores, in a same packet, the pixel data that is read out from a same area, and describes an area number indicating a position of the area in a frame in the same packet.

(9)
The imaging apparatus according to (8), wherein the data output unit further describes, in the same packet, at least one of a frame number indicating a place in a chronological order of a frame to which the area belongs, a subframe number indicating a time of performance among several times, in a case where exposure and readout have been performed several times for the area in one frame period, and a summation pattern indicating a pixel summing method for the area.

(10)
The imaging apparatus according to any of (7) to (9), further including a re-synthesis unit for re-synthesizing the frame on the basis of the image data, generated by the data output unit, in which the pixel data is packetized on a per-area basis.

(11)
An imaging method to be performed by an imaging apparatus including an image sensor unit for generating pixel data of a pixel constituting a frame by photoelectric conversion, the method including:
calculating an amount of camera shake in each of areas obtained by dividing the frame; and
controlling exposure time of the image sensor for each of the areas according to the amount of camera shake calculated for each of the areas.

(12)
A program for controlling an imaging apparatus including an image sensor unit for generating pixel data of a pixel constituting a frame by photoelectric conversion, the program being for causing a computer of the imaging apparatus to perform:
calculating an amount of camera shake in each of areas obtained by dividing the frame; and
controlling exposure time of the image sensor for each of the areas according to the amount of camera shake calculated for each of the areas.

(13)
A reproduction apparatus for reproducing image data that is output from an imaging apparatus including
an image sensor unit for generating pixel data of a pixel constituting a frame by photoelectric conversion,
a calculation unit for calculating an amount of camera shake in each of areas obtained by dividing the frame,
a control unit for controlling exposure time of the image sensor for each of the areas according to the amount of camera shake calculated for each of the areas, and
a data output unit for generating the image data by packetizing, for each area, pixel data that is read out from the image sensor unit,
the reproduction apparatus including:
an acquisition unit for acquiring the image data in units of a packet; and
a restoration unit for analyzing a packet of the acquired image data, and restoring the frame on the basis of each area corresponding to the packet.

(14)
The reproduction apparatus according to (13), wherein the packet of the image data stores the pixel data that is read out from a same area, and an area number indicating a position of the area in a frame is described in the packet.

(15)
The reproduction apparatus according to (14), wherein at least one of a frame number indicating a place in a chronological order of a frame to which the area belongs, a subframe number indicating a time of performance among several times, in a case where exposure and readout have been performed several times for the area in one frame period, and a summation pattern indicating a pixel summing method for the area is further described in the packet of the image data.

REFERENCE SIGNS LIST

10 Imaging apparatus
11 Imaging unit
12 Angular velocity sensor
13 Motion information acquisition unit
14 Motion amount calculation unit
15 Exposure/readout control unit
16 Data output unit
17 Reproduction unit
18 Data acquisition unit
19 Image re-synthesis unit
20 Image display unit
31 Optical lens unit
32 Image sensor
41 Pixel unit
42 ADC
43 ADC group
44 Area
50 Packet
100 Computer
101 CPU

The invention claimed is:

1. An imaging apparatus comprising:
an image sensor configured to generate pixel data of a pixel that constitutes a frame by photoelectric conversion;
circuitry configured to:
calculate an amount of camera shake in each of a plurality of areas obtained by division of the frame; and
control exposure time of the image sensor for each of the plurality of areas according to the amount of camera shake calculated for each of the plurality of areas.

2. The imaging apparatus according to claim 1, wherein the circuitry is further configured to control a pixel summing method of the image sensor for each of the plurality of areas according to the amount of camera shake calculated for each of the plurality of areas.

3. The imaging apparatus according to claim 2, wherein the circuitry is further configured to execute exposure and pixel readout of the image sensor at least one time during one frame period for each of the plurality of areas according to the amount of camera shake calculated for each of the plurality of areas.

4. The imaging apparatus according to claim 2, wherein the circuitry is further configured to:
detect at least one of angular velocity or acceleration; and
calculate the amount of camera shake in each of the plurality of areas based on the at least one of the angular velocity or the acceleration.

5. The imaging apparatus according to claim 2, wherein the circuitry is further configured to calculate the amount of camera shake in each of the plurality of areas based on a variance of pixel data of a plurality of pixels sampled for each of the plurality of areas.

6. The imaging apparatus according to claim 2, wherein the image sensor includes, for each of a plurality of regions where a plurality of pixels are arranged, one analog digital converter (ADC) that is shared by the plurality of pixels, and wherein each of the plurality of areas corresponds to one of the plurality of regions where the plurality of pixels that share the one ADC is arranged.

7. The imaging apparatus according to claim 2, wherein the circuitry is further configured to packetize, for each of the plurality of areas, the pixel data that is read out from the image sensor to generate image data.

8. The imaging apparatus according to claim 7, wherein the circuitry is further configured to store, in a same packet, the pixel data that is read out from a same area, and describe an area number indicating a position of an area of the plurality of areas in the frame in the same packet.

9. The imaging apparatus according to claim 8, wherein the circuitry is further configured to describe, in the same packet, at least one of a frame number indicating a place in a chronological order of the frame to which the area belongs, a subframe number indicating a time of execution of exposure and readout for the area in one frame period, and a summation pattern indicating the pixel summing method for the area.

10. The imaging apparatus according to claim 7, wherein the circuitry is further configured to resynthesize the frame based on the image data in which the pixel data is packetized on a per-area basis.

11. An imaging method, comprising:
in an imaging apparatus including an image sensor configured to generate pixel data of a pixel constituting a frame by photoelectric conversion:
calculating an amount of camera shake in each of a plurality of areas obtained by dividing the frame; and
controlling exposure time of the image sensor for each of the plurality of areas according to the amount of camera shake calculated for each of the plurality of areas.

12. A non-transitory computer-readable medium having stored thereon, computer-executable instructions, which when executed by a processor of an imaging apparatus, cause the processor to execute operations, the operations comprising:
in the imaging apparatus including an image sensor configured to generate pixel data of a pixel constituting a frame by photoelectric conversion:
calculating an amount of camera shake in each of a plurality of areas obtained by dividing the frame; and
controlling exposure time of the image sensor for each of the plurality of areas according to the amount of camera shake calculated for each of the plurality of areas.

13. A reproduction apparatus, comprising:
first circuitry configured to:
acquire image data in units of a packet, wherein the image data is output from an imaging apparatus, the imaging apparatus including an image sensor that generates pixel data of a pixel of a frame by photoelectric conversion, and second circuitry that calculates an amount of camera shake in each of a plurality of areas obtained by division of the frame, controls exposure time of the image sensor for each of the plurality of areas according to the amount of camera shake calculated for each of the plurality of areas, and packetizes, for each of the plurality of areas, the pixel data that is read out from the image sensor to generate the image data;
analyze the packet of the acquired image data, and restore the frame based on each area of the plurality of areas corresponding to the packet; and
reproduce the image data.

14. The reproduction apparatus according to claim 13, wherein the packet of the image data stores the pixel data that is read out from a same area of the plurality of areas, and wherein an area number indicating a position of an area in the frame is described in the packet.

15. The reproduction apparatus according to claim 14, wherein at least one of a frame number indicating a place in a chronological order of the frame to which the area belongs, a subframe number indicating a time of execution of exposure and readout for the area in one frame period, and a summation pattern indicating a pixel summing method for the area is further described in the packet of the image data.

\* \* \* \* \*